United States Patent [19]

Change et al.

[11] 4,081,988

[45] Apr. 4, 1978

[54] PRESSURE TRANSDUCER CALIBRATION

[75] Inventors: Nicholas D. Change, West Seneca; Michael T. Riggs, Batavia, both of N.Y.

[73] Assignee: PCB Piezotronics, Inc., Depew, N.Y.

[21] Appl. No.: 779,255

[22] Filed: Mar. 18, 1977

[51] Int. Cl.² ............................................. G01L 27/00
[52] U.S. Cl. ........................................ 73/4 R; 73/167
[58] Field of Search ............................. 73/1 R, 4, 167

[56] References Cited

U.S. PATENT DOCUMENTS

| 3,854,331 | 12/1974 | Bateman, Jr. | 73/167 |
| 3,886,792 | 6/1975 | Change | 73/167 |

FOREIGN PATENT DOCUMENTS

| 664,982 | 6/1963 | Canada | 73/4 R |

Primary Examiner—S. Clement Swisher
Attorney, Agent, or Firm—Christel & Bean

[57] ABSTRACT

A calibration arrangement in combination with ammunition testing apparatus comprising an elongated test barrel and a piezoelectric transducer mounted in the barrel and having a contoured end surface in operative contact with the outer wall surface of a cartridge to be tested. The transducer converts pressure changes into electrical signals which are translated through an amplifier to a voltmeter for readout. The calibration arrangement includes a pressure tube element adapted to fit in the test barrel with one end in pressure-tight relation with the interior of an empty cartridge casing held in the test barrel and with the other end of the tube adjacent the opposite end of the test barrel. The tube is held by a retaining assembly against lengthwise movement in the test barrel. A conduit connects a source of known hydraulic pressure to the tube for introducing known calibration pressure to the interior of the cartridge casing. As a result, both test firing and calibration can be performed in the same test barrel.

11 Claims, 6 Drawing Figures

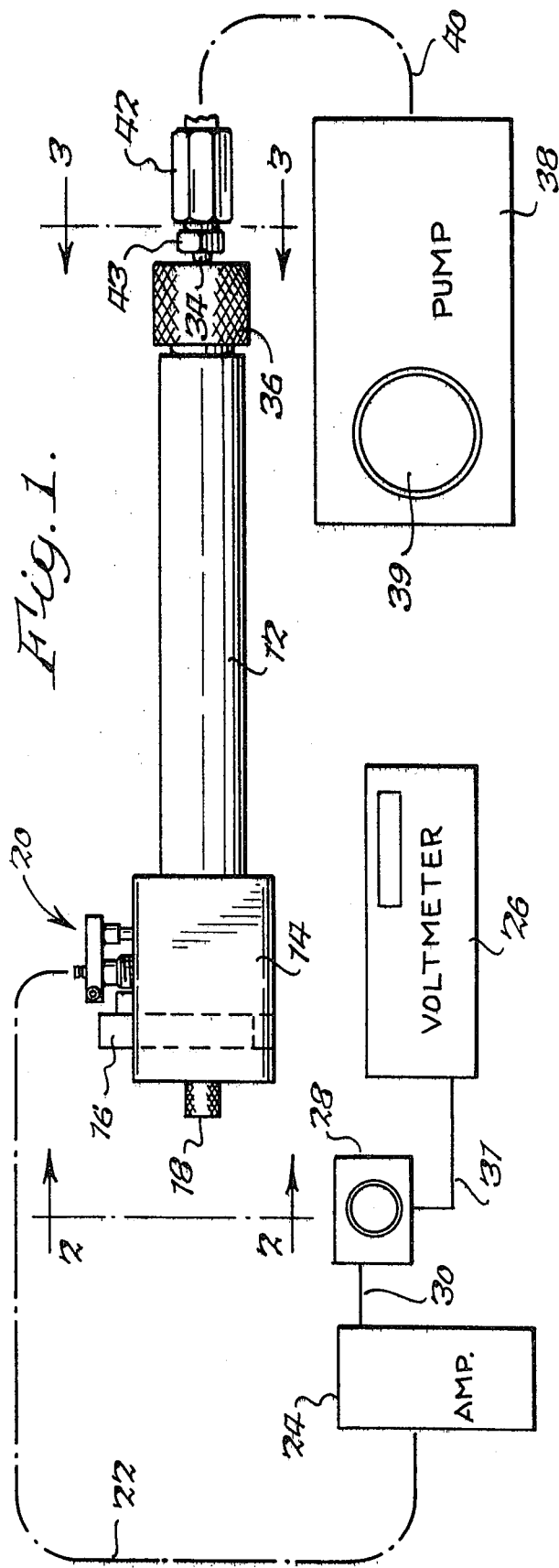

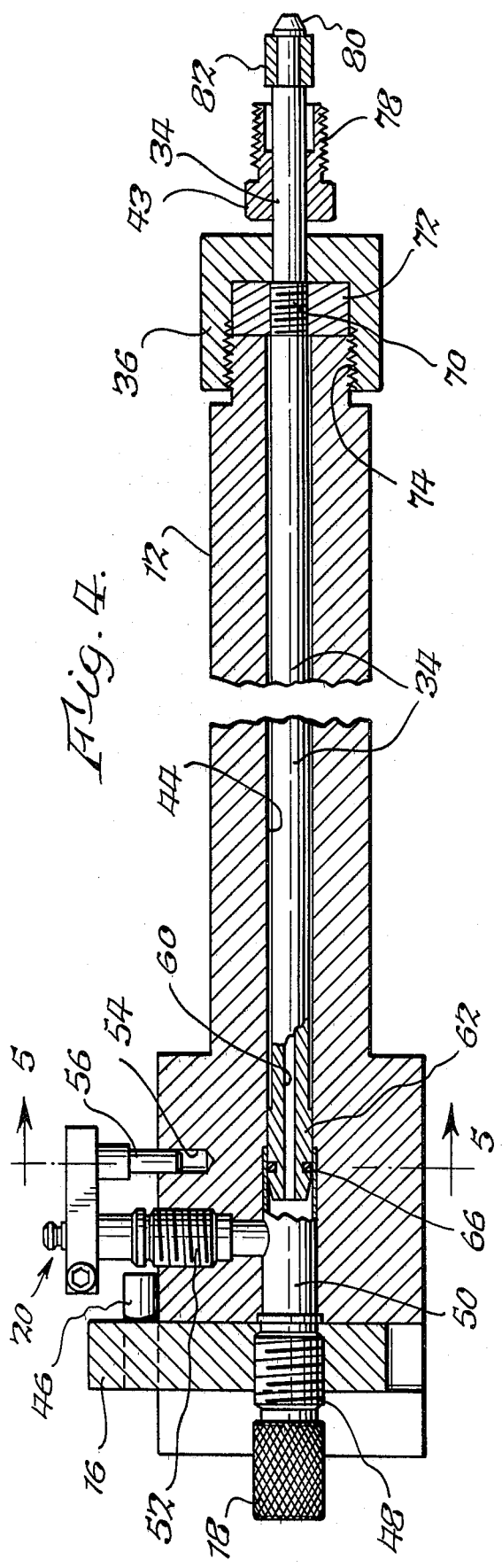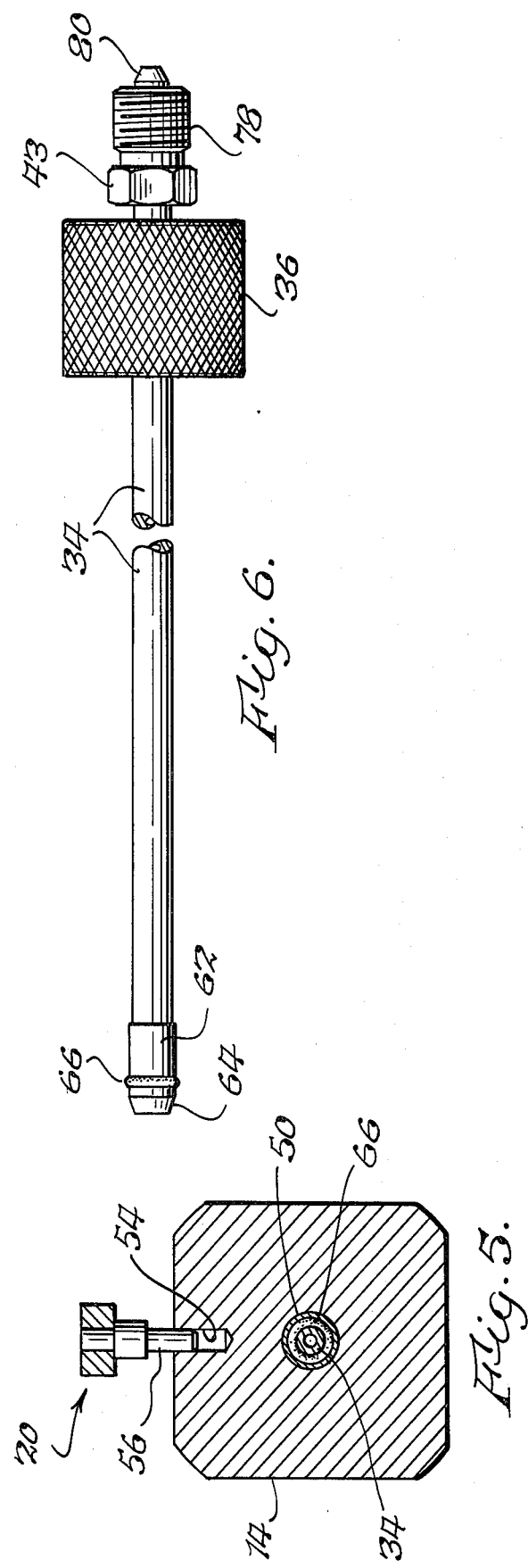

PRESSURE TRANSDUCER CALIBRATION

BACKGROUND OF THE INVENTION

This invention relates to the art of ammunition testing apparatus, and more particularly to new and improved calibration means for such apparatus.

One area of use of the present invention is in measuring through the case wall of an unmodified cartridge the chamber pressure developed during tests of guns and ammunition. Such ammunition testing apparatus comprises a test barrel, means at one end for holding a cartridge therein for test firing, and a transducer mounted in the barrel at that end and operatively contacting the cartridge for converting pressure changes into electrical signals. Heretofore, the transducer was calibrated in a separate simulated chamber and then removed and re-installed in the test barrel for test firing. Dimensional differences between the simulated chamber and the test barrel can cause significant errors in indicated peak pressure.

SUMMARY OF THE INVENTION

It is, therefore, a primary object of this invention to provide new and improved calibration means for ammunication testing apparatus.

It is a further object of this invention to provide calibration means for ammunition testing apparatus which allows both test firing and calibration to be performed in the same test barrel of the apparatus.

It is a further object of this invention to provide such calibration means which is highly accurate and relatively simple in construction.

It is a further object of this invention to provide such calibration means which is economical to manufacture and relatively easy to operate.

The present invention provides calibration means in combination with ammunition testing apparatus comprising an elongated test barrel and transducer means mounted in the barrel to be in operative contact with a cartridge to be tested for converting pressure changes into electrical signals. The calibration means comprises a pressure tube element adapted to fit in the barrel with one end in pressure-tight relation with the interior of an empty cartridge casing held in the test barrel and the other end adjacent the opposite end of the test barrel. The tube is held by retaining means against lengthwise movement in the barrel. Calibration supply means converted to the tube introduces known calibration pressure to the interior of the cartridge casing.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is an elevational view, partly diagrammatic, of ammunition testing apparatus provided with a calibration arrangement according to the present invention;

FIG. 2 is an end elevational view taken about on line 2—2 of FIG. 1;

FIG. 3 is an end elevational view taken about on line 3—3 of FIG. 1;

FIG. 4 is a fragmentary longitudinal sectional view of ammunition testing apparatus including calibration means according to the present invention;

FIG. 5 is a sectional view with parts removed taken about on line 5—5 of FIG. 4; and FIG. 6 is an elevational view with parts removed of the calibration means according to the present invention.

DETAILED DESCRIPTION OF THE ILLUSTRATED EMBODIMENT

In basic ammunition testing apparatus a test barrel holds a cartridge to be test fired and a transducer is mounted in the barrel in operative contact with the cartridge casing. Upon test firing of the cartridge, the pressure change is converted by the transducer into an electrical signal containing information of peak pressure.

In the apparatus of the present invention, the transducer is calibrated by means operatively associated with the test barrel comprising a hollow tubular element adapted to fit into the test barrel along the length thereof. The tube has a formation and seal element at one end providing a gas-tight connection with the interior of an empty cartridge casing held in the test barrel. Adjacent the opposite end of the tube there is provided a retainer element for connecting to the end of the test barrel to hold the tube in place. The end of the tube is provided with a connector element for connection to one end of a fluid pressure supply line, the other end of which is connected to a pump and gauge combination for introducing a known calibration pressure to the interior of the cartridge casing for calibrating the transducer. As a result, both calibration and test firing can be performed in the same test barrel without any need to remove the transducer.

Referring now to FIG. 1, there is shown ammunition testing apparatus provided with a calibration arrangement according to the present invention. The ammunition testing apparatus comprises an elongated cylindrical test barrel 12, preferably of steel, having an enlarged body portion 14 at one end, i.e. the left-hand end as viewed in FIG. 1. When a cartridge is to be test fired, a sliding breech block assembly is accommodated in body portion 14 which also holds the cartridge to be test fired. In the present illustration, there is provided means adjacent this end of barrel 12 for holding an empty cartridge to be calibration tested in the barrel including a substitute breech block assembly 16 disposed perpendicular to the longitudinal axis of barrel 12 and a cartridge case retaining screw 18 carried by block 16 which will be described in further detail presently. The testing apparatus further comprises transducer means generally designated 20 mounted in barrel 12 in operative contact with the cartridge being tested for converting pressure changes into electrical signals. Transducer 20 preferably is of the piezoelectric type and will be described in further detail presently. The electrical output signals from transducer 20 are connected by a line indicated at 22 to the input of a charge amplifier 24. The output of amplifier 24 is operatively coupled to a digital peak voltmeter 26 either directly or through a variable voltage source designated 28, which source is connected to amplifier 24 and meter 26 by lines 30 and 31, respectively.

The calibration arrangement comprises a hollow metal tubular element, a portion of which is designated 34 as seen at the opposite end of barrel 12, i.e. the muzzle end or right-hand end as viewed in FIG. 1, which tube 34 is received and extends along within the barrel 12. Tube 34 is provided with a formation at the one end which provides a gas-tight connection with the open end of an empty cartridge shell contained within barrel 12 adjacent the other end i.e. the left-hand end as viewed in FIG. 1. The tube 34 is held in barrel 12 by means including a retaining nut element 36 whiich threads onto the muzzle end of the barrel and which will be described in further detail presently. The calibration arrangement further comprises means in the form of a pressure source comprising a high pressure pump 38 combined with a gauge 39 which source is connected by means of a line 40 to the opposite end of the tubular element for introducing a known calibration pressure to the interior of the cartridge casing. A coupling 42 and a connector element 43 serve to join line 40 to the pressure tube 34 in a manner which will be described.

Referring now to FIG. 4, the test barrel 12 is generally cylindrical in shape and provided with a longitudinal bore or passage 44 of constant diameter extending along substantially the entire length thereof. The enlarged body 14 at the left-hand end as viewed in FIG. 4 preferably is rectangular in shape. The substitute breech block element 16 is provided with a pair of dowel-like elements 46, 47 which engage the top surface of the rectangular body portion 14. The cartridge retaining screw 18 has a threaded portion 48 which connects into the substitute breech block element 16. The end of passage 44 within element 14 is of slightly larger diameter to receive or accommodate the casing of a cartridge to be tested. In FIG. 4 an empty cartridge casing 50 is shown fitted in this end portion of the passage 44. The two diameter portions of passage 44 at the left-hand end of barrel meet in an annular shoulder which retains the open end of cartridge 50. The opposite closed end of cartridge 50 is held or retained by substitute breech block 16 and retaining screw 18 which is tightened against cartridge 50.

Body portion 14 is provided with a first opening or passage for accommodating the main body portion 52 of transducer 20 and is provided with a second bore 54 for accommodating a guide element 56 of transducer 20. The main body portion 52 of the transducer has a contoured end surface which firmly contacts the outer wall surface of cartridge 50 and included within the body portion 52 are piezoelectric elements for converting force acting through the cartridge wall or casing into electrical signals. Transducer 20 is similar to the transducer described in U.S. Pat. No. 3,960,018 issued June 1, 1976 and assigned to the assignee of the present invention, the disclosure of which is hereby incorporated by reference.

As shown in FIG. 4, the tubular element 34 is of sufficient length so that it extends along within the passage 44 of barrel 12 and fits into the open end of the cartridge casing 50. Tubular element 34 has a longitudinal bore or passage 60 formed therein, and the outer diameter of element 34 is slightly less than the inner diameter of passage 44 along substantially the entire length of element 34. An enlarged diameter portion 62 is provided at the one end i.e. the left-hand end as viewed in FIG. 4, the outer diameter of which is substantially equal to the inner diameter of passage 44 and the inner diameter of cartridge 50. The end of element 34 is provided with a chamfered surface portion 64 as shown in FIG. 6. An annular groove is formed in the enlarged diameter portion 62 slightly axially inwardly of the portion 64 and is fitted with an O-ring seal or gasket element 66. The O-ring 66, which is of rubber or like resilient material, has sealing contact with the inner surface of cartridge 50 when the end of tube 34 is received therein as shown in FIG. 4, and the outer surface of enlarged diameter portion 62 is in firm contact with inner surface of cartridge 50 and the inner surface of passage 44.

Near the opposite end of tubular element 34 there is provided a threaded portion 70 of relatively small axial length, and a removable tube retaining flange element 72 is threadably connected onto portion 70 of tube 34. The flange or stop element is cylindrical in shape. The location of threads 70 is such that when the inner surface of flange element 72 abuts or contacts the right-hand end of barrel 12 as viewed in FIG. 4, the opposite end of tube 34 including the chamfered portion 64 and O-ring 66 will be received within the cartridge casing 50 held at the opposite end of the assembly as shown in FIG. 4. The barrel 12 is provided with an externally threaded reduced diameter portion 74 at the muzzle end, i.e. the right-hand end in FIG. 4. The retaining nut element 36 is internally threaded and has a bore or passage whereby the element 34 extends through nut 36 which, in turn, fits over the retaining flange element 72 and threads onto the reduced diameter portion 74. With flange element 72 threaded to tube 32 and having one end face abutting the end of barrel 12 and the opposite end face abutting the inner surface of retainer element 36 which is threaded to barrel 12, tube 32 is held in barrel 12 in a manner preventing relative lengthwise movement. Connector element 43 is located between the retaining nut element 36 and the outer end of tube 34, and connector element 43 has external threads 78 to engage internal threads on the coupling element 42. The outer end of tube 34 is provided with a chamfered surface portion 80. A reduced diameter portion is provided on tube 34 slightly axially within portion 80 which receives a two piece split sleeve element 82 which, in turn, fits within a cylindrical recess at one end of the connector element 43.

The apparatus of the present invention operates in the following manner. The test barrel 12 is one of several test barrel types with which the calibration arrangement of the present invention can be used. Barrel 12 is of the type with an integral T-slot at the breech end, i.e. the left-hand end as viewed in FIGS. 1 and 4, to accommodate a sliding breech block. During actual test firing, the barrel 12 is held in a receiver and the breech block is fitted in place in body portion 14 to effect firing of the cartridges in a known manner. During calibration, the breech block assembly is removed from body 14 of barrel 12 and the substitute breech block assembly 16 is fitted into the integral T-slot as shown in FIGS. 1 and 4. As a result, the substitute breech block assembly 16 enables calibration to be performed without having the test barrel 12 mounted in a receiver. Another type of test barrel with which the calibration arrangement of the present invention can be used is the type known as the SAAMI test barrel which has no T-slot or other integral provision for a breech block but is designed to be used in a universal receiver which contains the sliding breech block and firing pin mechanism. In that situation the test barrel containing transducer 20 must be mounted in the universal receiver while being used for both calibration and for test firing since the breech block in the receiver is necessary to lock the cartridge in place in the chamber during both functions. The universal receiver generally will be slotted to provide clearance for the transducer 20. A third type of test barrel with which the calibration arrangement of the present invention can be used is that known as the heavy barreled bolt-action receiver test rifle, which is used mainly for rimfire testing. No separate receiver is needed during calibration of test firing since the bolt serves to lock the cartridge in place during both functions.

Transducer 20 is mounted in the body portion 14 of test barrel 12 permanently, that is, it is not removed but rather remains in the same barrel 12 during both test firing and calibration. When calibration is to be performed, the breech block assembly is removed from the end 14 thereby opening passage 44 at both ends of barrel 12, and the pressure tube 34 is inserted into the barrel in the following manner. The tube 34 alone is inserted into the barrel 12 from the breech end, i.e. the left-hand end as viewed in FIGS. 1 and 4, and advanced toward the opposite or muzzle end of the barrel 12. Tube 34 is advanced such that the portion 70 is outward and adjacent to the muzzle end of the barrel 12. The retaining flange element 72 then is threaded onto the portion 70 of the tube until the flange stops against the shoulder at the base of the threads, whereupon it is tightened up by hand. The retaining nut element 36 then is slipped over the end of tube 34 and threaded onto the muzzle end of barrel 12 and snugged up tightly by hand. Next, the gland nut element 43 is fitted onto the pressure tube 34 with the hexogonal end toward the retaining nut element 36 and the two sections of the split sleeve element 82 are assembled in place whereupon the gland nut element 43 is moved over onto the split sleeve element 82 to retain the two halves thereof. Then the coupling element 42 is threaded onto the gland element 43 and snugged up tightly by means of wrenches. Line 40 is connected at one end to the coupling 42 and tightened, and tube 40 then is connected at the other end to the output port of the pressure source 38.

After the foregoing procedure the empty cartridge 50 is fitted into the opposite end of barrel 12, i.e. the breech end, in the following manner. In order to obtain an adequate statistical sample for calibration of the transducer 20, a minimum number, for example about 20, of empty cartridge casings should be calibrated, and these cartridges are chosen from the lot of ammunition to be test fired. This is important so that the exact elastic characteristics of the cartridge can be taken into account during calibration. For center-fire testing, unfired primed cases with fired primers should be used, and the primers must be in place to provide a pressure seal at the boltface of the cartridge. Before a cartridge 50 is inserted into the chamber within body portion 14, the mouth of the cartridge should be inspected for rough edges or out of roundness. Such conditions can be corrected by counter sinking or shaping so that the cartridge casing will slide smoothly over the O-ring element 66 so as not to damage the ring. In addition, the case mouth can be wetted with hydraulic fluid or oil to aid in lubrication of the O-ring. The cartridge case 50 is inserted into the chamber and pressed gently until it seats firmly against the shoulder. Then the substitute breech block 16 is inserted into the T-slot in body 14, and the case retaining screw 18 is advanced until it seats up against the rear surface of the cartridge casing 50. In other types of test barrel arrangements, it is merely necessary to close the breech block.

With the empty cartridge in place, known pressure is applied to the pressure tube 34 to effect the hydraulic calibration of the transducer 20. One form of pressure source 38 found to provide satisfactory results is a model OH-101-150 high pressure, hand operated hydraulic pump with a 12 inch diameter, 100,000 psi (Heise) Bourdon tube reference standard pressure gage commercially available from Pressure Products, Inc. The apparatus has an accuracy of 100K psi gage, ± 0.1%. Amplifier 24 can be a model PCB 462A charge amplifier commercially available from PCB Piezotronics, Inc. Voltmeter 26 is of the d.c. digital type, 3½ digits minimum and accuracy ± 0.01%. Transducer 20 can be a model 117B conformal transducer installed in an 090 F test barrel, both commercially available from PCB Piezotronics, Inc. Hydraulic pressure monitored by the 0.1% accuracy Heise reference gage then is applied to the inside of the cartridge case, and the resultant output of transducer 20 is plotted against input pressure increments. The end result of the calibration is a determination of slope and pressure offset.

A typical calibration procedure is as follows. Since the end result of the transducer calibration is a determination of the transducer slope in units of picocoulombs/psi, it is convenient to arrange the charge amplifier 24 so that the output charge can be read directly in picocoulombs. Accordingly, the range selector of the charge amplifier 24 is set at 1000 units per volt range for pressures up to 40,000 psi and 10,000 units per volt for pressures up to 80,000 psi. The dial gain potentiometer of amplifier 24 is set to 10.00, assuming that charge amplifier 24 is the above-identified model 462A. It is advisable to verify, by calibration, that the transfer function of the charge amplifier is precisely 1000 picocoulombs per volt and/or 10,000 picocoulombs per volt. Then pressure from source 38 is applied to cartridge 50, increasing to 10,000 psi. The pressure is set precisely using the reference gage 39, the pressure is allowed to remain for approximately 5 seconds, the pressure is readjusted if necessary, and the voltage reading, actually the charge reading, is recorded. Then without dropping the pressure the next pressure level is immediately attained, the pressure is set, and the reading is recorded. With transducers having a full scale range of 40,000 psi or less, calibration increments of 5,000 psi are used, and for transducers with a full scale range above 40,000 psi, increments of 10,000 psi are used. The foregoing procedure is followed up to full scale, and the entire procedure is repeated for each cartridge casing used for calibration.

Test pressures always should be approached from below, i.e. by increasing the pressure, and never by decreasing the pressure. Only unfired cases should be used since the hardness of the fired cases may have been altered. The case should not be cycled before calibrating. One set of readings should be taken on each case which then is discarded. Since the family of values of output charge at each calibration point follows a random distribution about a mean value, the standard deviation at each point is a valid indication as to the preciseness of the calibration at that point.

When calibration is complete, the apparatus is used to measure peak pressures of that lot of ammunition from which the sample cartridge cases were taken. Pressure source 38 and line 40 are disconnected from tube 34, substitute breech block 16 and screw 18 are removed from body 14, the casing 50 is removed, tube 34 and its associated components are withdrawn from barrel 12, a cartridge to be test fired is placed in barrel 12, and a breech block is assembled into body 14. The dial of the charge amplifier 24 is set to the transducer slope in picocoulombs per psi as previously determined. The range of amplifier 24 is set to 10,000 psi per volt, and the output of the charge amplifier 24 is connected to a peak meter such as voltmeter 26 or a storage oscilloscope. The peak indicated pressure is determined as each round is fired, and then the previously determined pressure offset is added to these values to ascertain actual peak pressure from each round. When the source of additional voltage 28 is included in the system, direct readout of peak pressure from volt meter 26 is possible. The required offset as determined by the foregoing calibration procedure is automatically added by the adjustable supply 28.

It is therefore apparent that the present invention accomplishes its intended objects. The calibration arrangement according to the present invention for ammunition testing apparatus allows both test firing and calibration to be performed in the same test barrel. The calibration arrangement is highly accurate, easy to operate, simple in construction and economical to manufacture. While a single embodiment of the present invention has been described in detail, this is by way of illustration, not limitation.

We claim:

1. In combination with ammunition testing apparatus comprising an elongated test barrel, means adjacent one end of said barrel for holding a cartridge to be test fired in said barrel and transducer means mounted in said barrel to be in operative contact with a cartridge to be tested for converting pressure changes into electrical signals, calibration means comprising:
   a. a pressure tube element adapted to fit in said test barrel and extend along within said test barrel, said tube element being of sufficient length such that one end is received within an empty cartridge casing held in said barrel and the opposite end of said tube element is adjacent the other end of said barrel;
   b. means on said one end of said tube providing a pressure-tight relationship with the interior of the empty cartridge casing;
   c. means adjacent said opposite end of said tube engaging said barrel for holding said tube rigidly in said barrel; and
   d. calibration pressure supply means connected to said tube for introducing known calibration pressure to the interior of said empty cartridge casing.

2. The combination according to claim 1, wherein said means on said tube providing pressure-tight relationship with said interior comprises a portion of said tube having an outer diameter substantially equal to the inner diameter of said cartridge casing and a sealing gasket element carried by said portion for sealingly contacting the inner surface of said cartridge casing.

3. The combination according to claim 1, wherein tube holding means comprises a retainer element carried by said tube element and connected to said barrel adjacent said other end and an element fixed to said tube engaging said retainer element and said barrel for preventing lengthwise movement of said tube relative to said barrel.

4. The combination according to claim 1, wherein said tube holding means comprises a generally cylindrical stop element threaded onto said tube, said stop element having one end face contacting said other end of said barrel, and a generally cup-shaped retainer element having an opening in the base thereof through which said tube extends, the opposite end face of said stop element contacting the inner surface of said retainer element base, the inner wall surface of said retainer element having threads for engaging threads on the outer surface of said barrel adjacent said other end thereof.

5. The combination according to claim 1, wherein said calibration pressure supply means comprises a pump for supplying hydraulic fluid, conduit means connected at one end to said pump, and means coupling the other end of said conduit means to said opposite end of said pressure tube.

6. The combination according to claim 5, wherein said coupling means comprises a split sleeve element carried on said pressure tube adjacent said opposite end thereof, a connector element carried on said tube having a portion fitted over said split sleeve element and having external threads, and an internally threaded sleeve coupling jointed at one end to said conduit means and threaded onto said connector element.

7. The combination according to claim 1, wherein said transducer comprises a housing connected in said test barrel, a contoured end surface on said housing contacting the outer surface of said cartridge casing, and piezoelectric means within said housing operatively associated with said contoured end surface.

8. The combination according to claim 1, further including an amplifier having an input and an output, means connecting the output of said transducer means to the input of said amplifier, a voltmeter, and means coupling the output of said amplifier to said voltmeter.

9. The combination according to claim 8, further including a voltage source connected between the output of said amplifier and said voltmeter.

10. The combination according to claim 1, wherein said test barrel is of the type accommodating a breech block at the end holding a cartridge to be fired and further including a substitute breech block element assembled in said end of said barrel for holding an empty cartridge in said barrel during calibration, said substitute breech block being disposed generally normal to the longitudinal axis of said barrel and having one surface contacting the closed end of said cartridge.

11. The combination according to claim 10, further including a screw element carried by said substitute breech block element and located so as to contact the closed end of said cartridge for tightening said cartridge in said barrel.

* * * * *